(12) United States Patent
Weih et al.

(10) Patent No.: US 12,318,978 B2
(45) Date of Patent: Jun. 3, 2025

(54) METHOD FOR PRODUCING A DECORATIVE PART FOR A VEHICLE INTERIOR

(71) Applicant: Novem Car Interior Design GmbH, Vorbach (DE)

(72) Inventors: Philipp Weih, Haag (DE); Andreas Karl, Speinshart (DE)

(73) Assignee: Novem Car Interior Design GmbH, Vorbach (DE)

( * ) Notice: Subject to any disclaimer, the term of this patent is extended or adjusted under 35 U.S.C. 154(b) by 0 days.

(21) Appl. No.: 17/672,582

(22) Filed: Feb. 15, 2022

(65) Prior Publication Data

US 2022/0258392 A1    Aug. 18, 2022

(30) Foreign Application Priority Data

Feb. 16, 2021   (DE) .................... 10 2021 103 599.6

(51) Int. Cl.
  *B29C 45/14* (2006.01)
  *B29L 31/30* (2006.01)

(52) U.S. Cl.
  CPC .. *B29C 45/14688* (2013.01); *B29C 45/14795* (2013.01); *B29C 45/14811* (2013.01); *B29C 2045/14713* (2013.01); *B29L 2031/3005* (2013.01)

(58) Field of Classification Search
  CPC ........ B29C 45/14688; B29C 45/14795; B29C 45/14811; B29C 2045/14713; B29C 2045/14803
  See application file for complete search history.

(56) References Cited

U.S. PATENT DOCUMENTS

2020/0406599 A1    12/2020  Schmidt et al.
2021/0291754 A1    9/2021   Topp et al.

FOREIGN PATENT DOCUMENTS

| DE | 4301444 A1 | | 7/1994 |
|---|---|---|---|
| DE | 102012212804 | * | 1/2014 |
| DE | 102012110161 A1 | | 4/2014 |
| DE | 10 2012 024 056 A1 | | 6/2014 |
| DE | 102014006567 A1 | | 11/2015 |
| DE | 10 2015 109 597 A1 | | 1/2017 |
| DE | 102017100512 A1 | | 7/2017 |
| DE | 102017216130 A1 | | 3/2019 |
| DE | 202018104438 U1 | | 8/2019 |
| DE | 102018207296 A1 | | 11/2019 |
| DE | 102019127630 A1 | | 4/2021 |
| EP | 2628627 | * | 4/2016 |
| EP | 3756888 A1 | | 12/2020 |
| EP | 4043176 A1 | | 8/2022 |
| WO | 2017/121516 A1 | | 7/2017 |
| WO | 2019/214957 A1 | | 11/2019 |
| WO | 2020/064404 A1 | | 4/2020 |

OTHER PUBLICATIONS

Machine English translation of DE 102018207296 as found on Google Patents (Year: 2023).*
European Search Report received for EP Patent Application No. 22156784.5, mailed on Jun. 23, 2022, 2 pages.
Harper C.A., "Handbook of Plastic Processes", Feb. 17, 2023, pp. 664-675.
Office Action received for German Patent Application No. 102021103599.6, mailed on Mar. 21, 2023, 2 pages.

* cited by examiner

*Primary Examiner* — Edmund H Lee
(74) *Attorney, Agent, or Firm* — Workman Nydegger

(57) ABSTRACT

A method for producing a vehicle interior decorative part comprises providing a substrate film, forming a composite layer by applying a decorative ply to a first side of the substrate film, micro-perforating the decorative ply in one or more regions, inserting the composite layer made of substrate film and micro-perforated decorative ply into a cavity of an injection mold wherein, when plastics material is injected into the cavity, the decorative ply of the composite layer is back-injected and a second side of the substrate film opposite the first side is pressed against a wall of the cavity, closing the cavity and injecting plastics material into the cavity to form the decorative part substrate, the decorative ply being back-injected and the decorative ply being applied to a surface of the substrate facing the decorative ply during substrate formation in the cavity, and opening the cavity and removing the decorative part.

13 Claims, No Drawings

METHOD FOR PRODUCING A DECORATIVE PART FOR A VEHICLE INTERIOR

CROSS-REFERENCE TO RELATED APPLICATIONS

The present invention claims the benefit of priority to German Patent Application No. 10 2021 103 599.6, filed on Feb. 16, 2021, the entire content which is incorporated herein by reference.

BACKGROUND OF THE INVENTION

1. Field of the Invention

The invention relates to a method for producing a decorative part for a vehicle interior. The decorative part to be produced includes a substrate and a decorative layer applied to the substrate, a front side of the decorative layer opposite the substrate forming a visible side of the decorative part.

2. The Relevant Technology

In general, when designing vehicle interiors, there is a desire for seamless, smooth design surfaces. A functional integration of required operating and/or display and/or lighting elements and other components in the decorative parts is therefore desired. Thus, the visible side of the decorative parts should integrate operating and/or information and/or lighting functions, for example, and thereby replace independent components for these functions. In order to satisfy the desire for seamless, smooth design surfaces, there is a requirement to design these functions so that they are integrated into the decorative parts in such a way that they are not visible when not in use; i.e., when they are not in use, a seamless, smooth design surface should be visible to the viewer on the visible side of the decorative parts. Functions or functional components should only be visible when they are used, i.e., when they are active. In the inactive state, on the other hand, functions or functional components, such as switches, buttons and display devices, should not be visible. In this case, the visible side of the decorative part is not interrupted by these, and the design appears seamless, consistent and smooth to the viewer.

For example, the integration of display devices in decorative parts for the vehicle interior is known. These display devices have a display field that is integrated into the visible side of the decorative part and thus appears as a black or dark region when not in use. These black or dark regions stand out from the rest of the design of the decorative parts and are perceived as unattractive. There is therefore a desire for the display device or the display field of the display device on the visible side of the decorative part to be visible only when the display device is switched on and a display is shown on the display field.

BRIEF SUMMARY OF THE INVENTION

The object of the invention is to provide a new method for producing decorative parts, in particular a method for producing decorative parts which meet the aforementioned requirements. The method should preferably allow simple and/or cost-effective production of the decorative parts.

This object is achieved by a method comprising the features as recited in the claims. Advantageous embodiments and further developments are provided in the dependent claims.

The method according to the invention is provided for producing a decorative part for a vehicle interior, the decorative part comprising a substrate and a decorative layer applied to the substrate, a front side of the decorative layer opposite the substrate forming a visible side of the decorative part.

DETAILED DESCRIPTION OF THE PREFERRED EMBODIMENTS

The method according to the invention includes the following steps:
a) providing a substrate film,
b) forming a composite layer by applying a decorative ply to a first side of the substrate film,
c) micro-perforation of the decorative ply in one or more regions or over the entire surface,
d) inserting or drawing in the composite layer made of substrate film and micro-perforated decorative ply in a cavity of an injection mold in such a way that when plastics material is injected into the cavity, the decorative ply of the composite layer is back-injected and a second side of the substrate film opposite the first side is pressed against a wall of the cavity,
e) closing the cavity and injecting plastics material into the cavity to form the substrate of the decorative part, the decorative ply being back-injected and the decorative ply being applied to a surface of the substrate facing the decorative ply during substrate formation in the cavity, thereby forming the decorative layer of the decorative part,
f) opening the cavity and removing or ejecting the decorative part.

The pressure of the plastics material injected in step e) presses the substrate film against the wall of the cavity. The decorative ply, for example a lacquer coat, is bonded to the injected plastics material due to the temperature and/or the pressure of this plastics material. At the same time, the decorative ply can detach from the substrate film, but this is not absolutely necessary.

Micro-perforation is understood as meaning the introduction of a large number of through-holes in the decorative ply. The decorative ply has been removed in the region of the holes. The cross-sectional dimensions of these holes are, for example, in the range from 50 to 150 µm, for example 90 µm. All of the holes can be evenly distributed over the micro-perforation region. In this case the hole density is constant. All holes can also have the same cross-sectional shape and the same dimensions. A circle, for example, comes into consideration as a cross-sectional shape. Thus, circular holes, for example, could be evenly distributed in the region of the micro-perforation of the decorative ply. The hole diameters are preferably selected in such a way that the holes on the visible side are not visible to an observer when viewed normally without aids and without backlighting, that is to say the observer only sees the uniform, continuous, seamless design. An interruption in the design due to a display of a display device, for example, only becomes visible when the holes are backlit. With a typical hole diameter in the range from 50 to 150 µm, the hole spacing is typically in the range from 60 to 160 µm. Such a micro-perforation thus has a resolution in the range from 423 to 159 dpi. With a hole spacing of 100 µm, the resolution is 254 dpi. Smaller hole diameters in the range below 50 µm, for example in the range from 10 to 50 µm, are also possible.

In this case, the hole spacing can be between 12 and 60 µm, for example, and the resolution can be in the range from 2117 to 423 dpi.

Step f) can be followed directly or, if necessary, after further intermediate steps, by step g), which provides: removing the substrate film during the removal or ejection of the decorative part from the cavity or after its removal or ejection, the decorative ply remaining on the substrate as a decorative layer. Alternatively, however, the substrate film can also remain on the decorative part.

If the aforementioned step g) is provided in the method according to the invention, the substrate film can also be a continuous film on which the decorative ply is applied over the entire surface or in certain regions. In this case, a region of the substrate film provided with the decorative ply is drawn into the cavity in step d), for example by means of an automatic feed. In step g), the substrate film detaches from the decorative layer now produced when the decorative part is removed or ejected. The region of the substrate film that is now free of the decorative ply is moved out of the cavity and at the same time, according to step d), another region of the substrate film provided with a decorative ply enters the cavity, so that after the decorative part has been removed or ejected from the cavity, steps e) and f) and g) can be carried out. This sequence can be repeated many times, in particular in an automated manner.

It is also possible in step d) to insert individual substrate films provided with the micro-perforated decorative ply into the cavity and to back-inject them in accordance with step e). In this case, the substrate film can also remain on the decorative part after ejection. However, it is also possible to remove the substrate film after the removal or ejection of the decorative part in accordance with the aforementioned step g). This process can also be automated.

The above statements show that the production of the micro-perforation in the decorative ply before it is applied to the substrate allows a simple, efficient and therefore cost-effective method sequence in the production of the decorative parts.

The application of the decorative layer to the substrate provided according to the invention by transferring the decorative ply applied to a substrate film allows the preparation of the decorative ply and thus the decorative layer before the actual application. The decorative ply is micro-perforated while still on the substrate film. Because the micro-perforation holes are through-holes, their introduction on the substrate could lead to its damage, for example by laser radiation used to form the holes causing the substrate to become cloudy. In the micro-perforation of the decorative ply on the substrate film, only the substrate film may be damaged, which is not required for the decorative part to be produced and is therefore removed anyway.

The vanishing effect is also advantageous, i.e., the invisibility of the holes in the micro-perforation for an observer when the holes are not backlit. In this case, the visible side of the decorative part appears to an observer as a seamless, smooth and consistent design surface without imperfections. With backlighting, however, operating and/or information and/or lighting functions integrated into the decorative part become visible. These can thus replace independent components for these functions.

A further development provides that the plastics material injected in step e) is a transparent plastics material and the substrate formed is a transparent substrate. This creates a decorative part with a comparatively high transmission. Clouding or other damage to the transparent substrate when the micro-perforation is introduced is ruled out in the method according to the invention, because the micro-perforation is produced before the decorative layer is applied to the substrate in the decorative ply prepared for this purpose on the substrate film and only then is transferred to the substrate. This rules out poor transillumination and/or a change in the color rendering, as can occur when the micro-perforation is produced in a decorative layer that has already been applied to the substrate.

According to one embodiment of the invention, the decorative part to be produced has a display device. The display device is attached, for example after step f) or step g), to a rear side of the substrate opposite the decorative layer and/or in a recess in the substrate. The attachment is effected in such a way that a display field of the display device faces the decorative layer and a display generated by the display field is thus visible through the micro-perforation of the decorative layer on the visible side of the decorative part.

A viewer can thus recognize a display generated by the display field on the visible side of the decorative part. In any case, the display can be seen when the viewing angle is 90°, i.e., a viewer of the decorative part looks perpendicularly at the front side of the decorative part and thus parallel to the extension of the micro-perforation holes through the decorative layer.

At an oblique viewing angle, i.e., an angle between 0° (parallel to the front of the decorative part) and 90° (perpendicular to the front of the decorative part), the visibility depends on the thickness of the decorative layer and the cross-sectional dimensions of the holes, i.e., in the case of circular holes, on the diameter of the holes. The thinner the decorative layer having the same cross-sectional dimensions, the smaller the viewing angle at which the display is still visible to the viewer. Furthermore: The larger the cross-sectional dimensions at the same thickness of the decorative layer, the smaller the viewing angle at which the display is still visible to the viewer. However, in order to obtain a high resolution of the visible display, the selected micro-perforation holes must be as small as possible. Thus, for a given hole diameter, the thickness of the decorative layer determines the possible oblique viewing angle. Starting from the perpendicular view at a viewing angle of 90°, the smaller the viewing angle and thus the more oblique the views of the display that are possible, the thinner the decorative layer is. The method according to the invention thus allows decorative parts with micro-perforations that cover the display surfaces of display devices, the display shown by the display device having a comparatively low viewing angle dependency, i.e., starting from a vertical viewing angle on the front side of the decorative layer, the display is visible even down to small viewing angles. As a result, viewers can see or read the display in the vehicle interior at different positions. This visibility, i.e., the minimum viewing angle or the sharpest deviation from the vertical below which the display still is visible or readable, can be set by corresponding selection of the conditions of thickness of the decorative ply or decorative layer on the one hand and the diameter of the holes of the decorative ply or decorative layer on the other hand.

A further advantage of the method according to the invention results from the prior production of the micro-perforation holes still on the substrate film. The edges of the holes are designed with comparatively high edge sharpness at the hole ends on the side facing the substrate and/or on the side facing the visible side. This results in a comparatively precise and smooth presentation or visibility of the display for the viewer.

A further advantage of the micro-perforation in the decorative layer produced using the method according to the invention in connection with display devices is the very good reproduction of brightness and color point of the display visible through the micro-perforation.

The production of the micro-perforation already in the decorative ply on the substrate film and the associated avoidance of cloudiness and/or changes in color rendering in the transparent substrate has the advantage with regard to the display devices that cheaper better display technologies with lower luminosity can be used. Due to the lower luminosity required, heat sinks can also be omitted or have smaller dimensions.

Different designs can be considered as display devices, for example LCDs or LED displays or PLED displays.

According to one embodiment, in step e) the plastics material penetrates into the micro-perforation produced in step d) during injection and the micro-perforation is partially or completely filled with the injected plastics material.

The injected plastics material can be polyurethane PUR and/or polycarbonate PC, or the injected plastics material includes polyurethane PUR and/or polycarbonate PC.

The micro-perforation of the decorative ply in step c), i.e., the introduction of the holes in the decorative ply, can be done, for example, using lasers. This can indeed damage the substrate film. However, because this is removed from the decorative part anyway, it is harmless. On the other hand, if the micro-perforation is formed in the decorative layer already applied to the substrate, this could have a disadvantageous effect on the substrate, for example due to clouding and/or color changes.

The substrate film provided in step a) can be a hot-stamping film and/or an IMD film, i.e., a film suitable for the method referred to as in-mold decoration, IMD for short. Step e) can thus constitute a hot stamping, in which the decorative layer is transferred by heat and/or pressure from the substrate film to the substrate during its manufacture.

The substrate film has a thickness on the order of about 200 μm, for example.

The decorative ply applied in step b) can be a lacquer coat and/or coat of paint.

The decorative ply can be applied to the substrate film by means of a printing method, for example.

A variant of the method provides that a protective and/or optical layer is applied to the front side of the decorative layer, in particular after step f) or after step g). The protective and/or optical layer can comprise PUR and/or a thermoplastic material or be formed from PUR and/or a thermoplastic material.

As intermediate steps or also after the described method steps, method steps known per se for the final treatment of the molded parts can take place, for example cutting and/or milling and/or grinding steps.

The invention claimed is:

1. A method for producing a decorative part for a vehicle interior, wherein:
the decorative part comprises a substrate and a decorative layer applied to the substrate, wherein a front side of the decorative layer opposite the substrate forms a visible side of the decorative part, and
the method comprises the steps of:
a) providing a substrate film,
b) forming a composite layer by applying a decorative ply to a first side of the substrate film,
c) applying micro-perforation of the decorative ply in one or more regions or over the entire surface, wherein the micro-perforation of the decorative ply introduces a plurality of through-holes on the decorative ply by removing the decorative ply in the region of the through-holes, whereby the through-hole have diameters that are selected such that the through-holes are not visible to an observer on the visible side of the decorative part when viewed without aids and without back-lighting;
d) inserting or drawing in the composite layer made of substrate film and micro-perforated decorative ply into a cavity of an injection mold in such a way that, when plastics material is injected into the cavity, the decorative ply of the composite layer is back-injected and a second side of the substrate film opposite the first side is pressed against a wall of the cavity,
e) closing the cavity and injecting plastics material into the cavity to form the substrate of the decorative part, the decorative ply being back-injected and the decorative ply being applied to a surface of the substrate facing the decorative ply during substrate formation in the cavity, thereby forming the decorative layer of the decorative part,
f) opening the cavity and removing or ejecting the decorative part.

2. The method according to claim 1, wherein:
step f) is followed by the following step:
g) removing the substrate film during the removal or ejection of the decorative part from the cavity or after its removal or ejection, the decorative ply remaining on the substrate as a decorative layer.

3. The method according to claim 1, wherein:
the plastics material injected in step e) is a transparent plastics material and the substrate formed is a transparent substrate.

4. The method according to claim 3, wherein:
the decorative part to be produced has a display device, the display device being attached to a rear side of the substrate opposite the decorative layer and/or in a recess in the substrate, and
the attachment being effected in such a way that a display field of the display device faces the decorative layer and a display generated by the display field is thus visible through the micro-perforation of the decorative layer on the visible side of the decorative part.

5. The method according to claim 1, wherein:
in step e) the plastics material penetrates into the micro-perforation produced in step d) during the injection and the micro-perforation is partially or completely filled with the injected plastics material.

6. The method according to claim 1, wherein:
the injected plastics material is or comprises polyurethane PUR and/or polycarbonate PC.

7. The method according to claim 1, wherein:
the micro-perforation of the decorative ply in step c) is performed using lasers.

8. The method according to claim 1, wherein:
the decorative ply applied in step b) is a lacquer coat and/or coat of paint.

9. The method according to claim 1, wherein:
a protective and/or optical layer is applied to the front side of the decorative layer.

10. The method according to claim 1, wherein:
the substrate film provided in step a) is a hot-stamping film and/or IMD film.

11. The method according to claim 1, wherein:
the cross-sectional dimensions of said through-holes are in the range from 50 to 150 μm.

12. The method according to claim 1, wherein:
the plurality of through-holes are evenly distributed where applied over the one or more regions which are microperforated, or over the entire surface.

13. The method according to claim 1, wherein:
wherein all holes have the same cross-sectional shape and the same dimensions.

\* \* \* \* \*